United States Patent
Schweizer

(12) 
(10) Patent No.: US 6,648,565 B2
(45) Date of Patent: Nov. 18, 2003

(54) TOOL HOLDER WITH COOLANT TUBE

(75) Inventor: Anton Schweizer, Wurmlingen (DE)

(73) Assignee: Chiron-Werke GmbH & Co. KG, Tuttlingen (DE)

( * ) Notice: Subject to any disclaimer, the term of this patent is extended or adjusted under 35 U.S.C. 154(b) by 0 days.

(21) Appl. No.: 09/886,968

(22) Filed: Jun. 21, 2001

(65) Prior Publication Data

US 2002/0015625 A1 Feb. 7, 2002

(30) Foreign Application Priority Data

Jun. 23, 2000 (DE) .......................... 100 30 844

(51) Int. Cl.[7] .............. B23C 5/28; B23Q 11/10; B23B 51/06
(52) U.S. Cl. .......................... 409/136; 409/234; 408/57; 408/59
(58) Field of Search ................. 409/135, 136, 409/234; 428/59, 56, 57

(56) References Cited

U.S. PATENT DOCUMENTS 5,702,211 A  * 12/1997 Roemer et al. ............... 279/20
5,788,433 A     8/1998 Grund et al. ................ 409/136

FOREIGN PATENT DOCUMENTS

DE    196 21 240 C2   5/1998
EP    0 925 869 A2    6/1999

* cited by examiner

*Primary Examiner*—A. L. Wellington
*Assistant Examiner*—Erica E Cadugan
(74) *Attorney, Agent, or Firm*—Weingarten, Schurgin, Gagnebin & Lebovici LLP

(57) ABSTRACT

A coolant tube (21) is to be arranged in a tool holder, the coolant tube (21) having an inlet opening (23) for coolants, a cover (31) at the inlet opening (23) for preventing chips from entering into the coolant tube (21), and an exchangeable insert tube (59) arranged within the coolant tube (21) and holding the cover (31).

11 Claims, 3 Drawing Sheets

TOOL HOLDER WITH COOLANT TUBE

BACKGROUND OF THE INVENTION

1. Field of the Invention

The present invention relates to a coolant tube for a holder for a tool having a tapered hollow shaft with an upper opening for clamping into a tool receptacle, wherein the coolant tube is arranged in the interior of the tapered hollow shaft for supply of coolants to the tool, and the coolant tube has an inlet opening for coolants, said inlet opening facing the upper opening, and an upper tube section which, when the holder is clamped in the tool receptacle, projects into a supply tube for coolants, said supply tube overlapping the coolant tube at least partially, whereby a covering is provided for the inlet opening, which prevents chips from entering into the coolant tube.

The invention further concerns a holder having a coolant tube of this kind.

2. Related Prior Art

Such a holder with coolant tube is known from DE 196 21 240 A1.

These holders, which are also called HSK tool holders, consist substantially of three sections, namely the tapered hollow shaft, adjoining which at the bottom is a thickened collar on which gripper grooves for automatic tool changing mechanisms are provided. Adjoining said collar at the bottom is a holding shaft onto which a variety of tools can be attached. Since some of said tools in operation must be cooled with coolant, a centered, stepped threaded hole is provided in the interior of the tapered hollow shaft into which hole a coolant tube can be threaded. Said coolant tube has a central coolant conduit through which the coolant coming from the machine tool arrives at the respective tool.

Tool holders of this kind, or HSK tool holders, are standardized, they can be fitted with various tools and then clamped into a tool receptacle, which is provided in a spindle of a machine tool and has an opening complementary to the tapered hollow shaft.

The tapered hollow shaft is equipped with an upper opening through which jaw segments and the draw-in taper of a clamping system can engage into the interior of the tapered hollow shaft. Clamping of the tapered hollow shaft into the receptacle is accomplished by the fact that the jaw segments, in their released position, are first swung inward and inserted, together with the draw-in taper, through the opening into the tapered hollow shaft. The draw-in taper is then pulled partly back out of the tapered hollow shaft via its draw-in rod, thereby pressing the jaw segments outward in their clamping position, in which they rest against the interior of the tapered hollow shaft and clamp the latter nonrotatably to the spindle.

When the holder is inserted into the tool receptacle, the coolant tube enters a centered bore, provided in the draw-in taper and the draw-in bar, through which coolant is then delivered during operation. Provided in the front region of said bore is a sealing ring, preferably an O-ring, which comes into contact with the cylindrical outer enveloping surface of the coolant tube.

In machine tools, problems repeatedly occur in connection with the supply of coolant to the tools. Coolant supply is often interrupted by clogged coolant conduits in the tools themselves or influenced disadvantageously by the fact that the seal between the coolant tube and the coolant delivery system on the machine tool becomes leaky, so that coolant pressure declines and is no longer sufficient to push coolant into the small coolant conduits in the tools. A diminution in the coolant supply due to clogged coolant conduits or a leaking seal often leads, however, to overheating and thus to damage of the tool, so that frequent cleaning of the holder, the coolant tube, and the tools with which the holders are fitted, is necessary. In addition, the sealing ring on the machine tool must be replaced at relatively short intervals. If these time- and wage-intensive actions are omitted, the operational reliability of the machine tools equipped with the holders is reduced.

In the case of the coolant tube mentioned in DE 196 21 240 A1, the problem is remedied by providing a cover for the inlet opening which prevents chips from entering into the coolant tube.

Said cover is designed as a sieve, which rests on a shoulder of the coolant conduit running lengthwise through the coolant tube and which is held by a toothed ring in the upper widened diameter of the coolant conduit.

In operation, it turned out that due to wrong mounting or the pulsating coolant the toothed ring falls out or the sieve is jackknifed, so that the desired protection effect gets lost.

Moreover, it was realized that the sieve is dissolved which also results in a loss of the protection effect.

Therefore, in EP 0 925 869 A2, a further development is described, in which at the top of the coolant tube an insert is arranged on which various sieves are provided. Said insert is held by a toothed ring in the coolant conduit.

By a sequence of fine sieves which are supported by coarser sieves it shall be prevented that the fine sieve is pushed into the coolant conduit.

It has turned out, however, that here, too, the toothed ring falls out or due to mounting problems the insert and/or the toothed ring are wrongly inserted or get lost already on transport, so that the desired protection effect is not reached.

In view of the above, it is an object of the present invention to improve the coolant tube in such a way that the disadvantages mentioned above are avoided. In particular, the operational safety of a machine tool with a constructively simple design and equipped with a holder with a coolant tube, as mentioned at the outset, is to be ameliorated.

SUMMARY OF THE INVENTION

According to the invention, this object is achieved with the holder and the coolant tube mentioned at the outset by providing in the coolant tube an exchangeable insert tube which holds the cover.

The object of the invention is in that way completely achieved.

The insert tube, which preferably runs through the coolant tube in its complete length, diminishes the clear width of the coolant conduit, so that it was originally assumed that the pressure applied to the cover was enforced and, thus, the danger of malfunction increased. In contrast, it turned out, however, that this was not the case. It turned out, namely, that, via the insert tube, a distinctively better support of the cover can be achieved, which now e.g. can be inserted between the upper end of the coolant tube and the insert tube, so that a toothed ring is not necessary any more.

It turned out, namely, that the toothed ring, which is used in the prior art for fixation of the cover, is one of the reasons for detaching covers. The toothed ring can namely not, as assumed, get jammed in such a way at the surface of the coolant tube that it is fixed in a safe position. The coolant tube is namely manufactured from hardened metal, so that the toothed ring cannot penetrate into the hardened surface.

Since the coolant tube is now completely interspersed by an insert tube, the clear width of the coolant conduit is reduced on the whole length of the coolant tube compared with the prior art, which, however, against all expectations, has neither resulted into problems.

It turned out, namely, that with the counter pressure of 70 bar occurring in operation, the transporting capacity of the coolant pump of 20 l/min still passes through the coolant tube, so that a sufficient coolant flux is ensured. If the tube, however, is run without counter pressure, so to speak in no-load operation, the transporting capacity is distinctively diminished by the insert tube additionally provided, what, originally, seemed to be against the use of such an insert tube. It turned out, however,—as mentioned—that the reduction of the cross-section of the coolant conduit is no problem during operation.

In a further development it is preferred if the coolant tube has on its top a rim which protrudes to the inner side.

This proceeding has the advantage that the cover is jammed between the protruding rim of the coolant tube and the insert tube, so that it is held in a safe position and cannot be detached. Another advantage is that the cover is held by the front surface of the coolant tube, so that it has a safe support.

Another advantage is that the cover must now be inserted into the coolant tube so to speak from behind, whereupon the insert tube is inserted. In that way, wrong mounting is not possible any more, because, if the cover gets jammed in the coolant tube, the insert tube cannot be inserted any more, and that means that the coolant tube cannot be fixed to the tool holder. In that way, wrong mounting is prevented.

On the other hand, it is preferred if the cover is fixed to the insert tube.

This measure has the advantage that the mounting of the cover on the insert tube is independent of the mounting of the cover on the coolant tube, latter is now done namely by simple insertion of the insert tube into the coolant tube. The requirements to the insert tube are completely different from the requirements to the coolant tube, so that the insert tube can be designed in such a way that the cover can be safely fixed to it.

It is also in this way that the safety problems from the prior art are overcome.

Generally, it is preferred if the cover has at least one sieve, whereby the insert tube further preferably has a centric coolant conduit, the inner diameter whereof widens step-like in the area of the inlet opening, while forming a shoulder, whereby the sieve rests on the shoulder.

Not only is this measure constructively advantageous, it also permits a simple fixation of the cover, i.e. the sieve, on the insert tube. The sieve is namely merely inserted from the front into the insert tube and held there for example with a toothed ring.

When doing so, it is preferred if the insert tube is manufactured from a softer metal than the coolant tube, preferably of brass.

The advantage here is that for example a toothed ring can distinctively easier and firmer be jammed in the coolant conduit in the insert tube than it is the case in the coolant tube itself.

In that measure, it is further preferred, however, if the insert tube is flanged at its top and the cover is jammed between the flanged top and the shoulder.

This measure ensures an even better fit of the cover in the insert tube and prevents, moreover, wrong mounting.

The cover, i.e. the sieve, is now placed from above onto the shoulder in the insert tube, after which the upper end of the insert tube is flanged. By said flanging, the sieve is safely held in the insert tube.

Should problems arise while mounting of the sieve on the insert tube for the reason that the sieve gets jammed, the flanging would not be sufficiently possible. Even if said failure is not realized during the manufacturing of the insert tube equipped with the sieve, it will be realized at the latest when the insert tube is inserted into the coolant tube and cannot be fitted there completely due to lacking of flanging or reversing at its top.

Said measure so has several advantages, one is that a constructively simple construction is chosen, the other is that it is, additionally, fail-safe because only if the sieve is correctly mounted in the insert tube, the latter can be completely inserted into the coolant tube.

Generally, it is preferred if the coolant tube has a flange on its lower end, by means of which it is screwed by means of a coupling nut with external thread to the holder.

Said measure is known per se, it has the advantage that the coolant tube can be exchanged. In that way, it is possible to replace the old coolant tube in existing holders by a coolant tube according to the invention.

It is further preferred if the insert tube has a flange at its end remote from the inlet opening, by means of which it is jammed between the flange of the coolant tube and the holder.

Said measure is constructively advantageous because it allows a safe fixing of the insert tube, without further mounting steps being necessary. When mounting the holder according to the invention, it is now merely required to insert the insert tube from behind into the coolant tube and then to fix the coolant tube—as usual—to the holder by means of a union nut.

Even further, it is preferred if there is supported on the sieve another sieve with finer mesh size.

Said measure is known per se, it ensures that on the outer side, i.e. facing the supply tube, a finer sieve rests, which even filters finest chips, and which is supported by a coarser sieve, so that it does not bend to the inside even when there is heavily pulsating coolant or clogging occurs.

Further advantages can be taken from the description and the enclosed drawings.

It is to be understood that the features mentioned above and those yet to be explained below can be used not only in the respective combinations indicated, but also in other combinations or in isolation, without leaving the scope of the present invention.

BRIEF DESCRIPTION OF THE DRAWINGS

An embodiment of the invention is shown in the drawings and will be explained in more detail in the description below. In the drawings.

DESCRIPTION OF A PREFERRED EMBODIMENT

Figure 1:
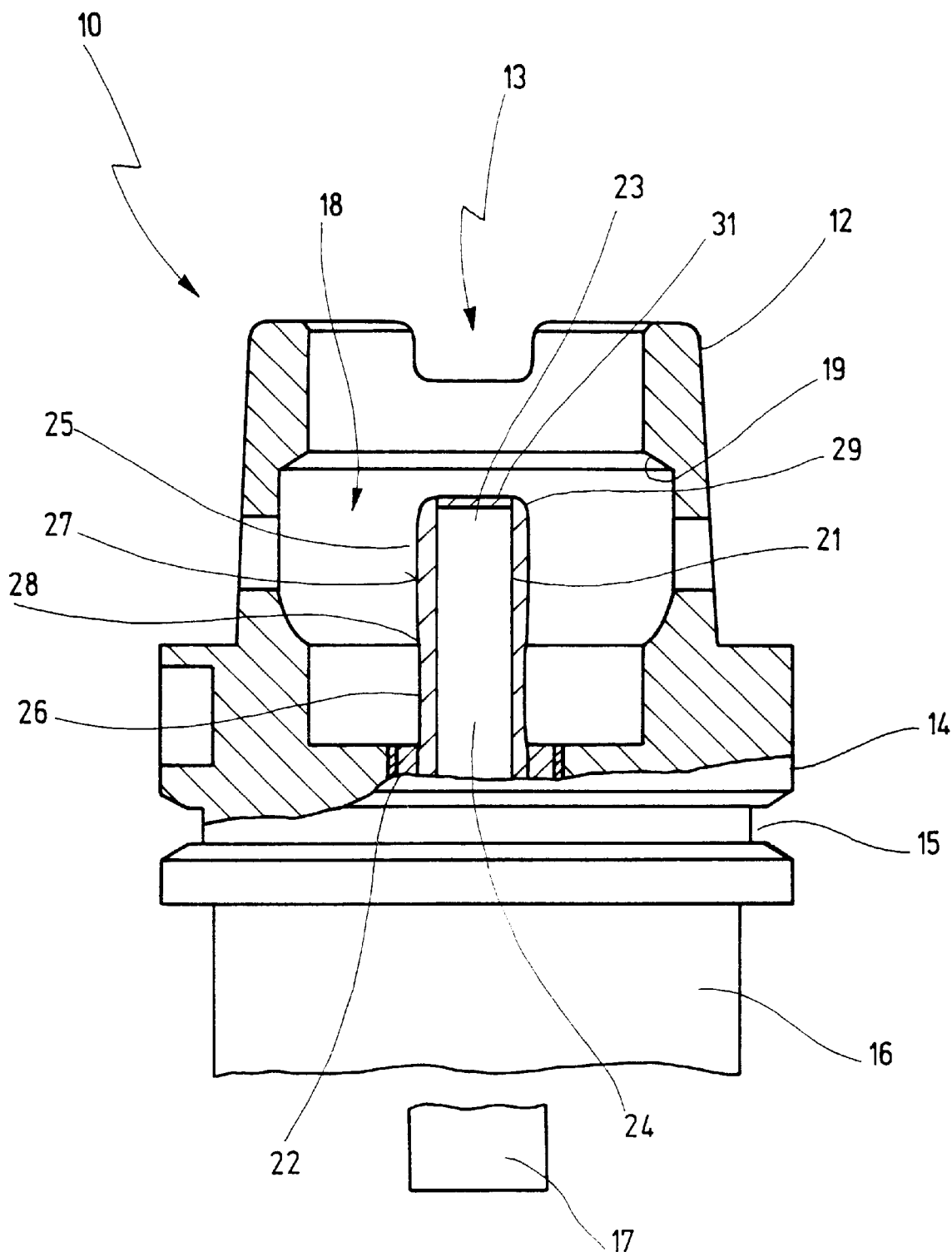
FIG. 1 shows the new holder with a new coolant tube in a schematic, partly sectioned side view.

In FIG. 1, 10 designates a holder for a tool that is not shown. The holder is shown in FIG. 1 in a schematic, partly sectioned side view.

Holder 10 has first of all a tapered hollow shaft 12, known per se, in which an upper opening 13 is provided. Adjoining tapered hollow shaft 12 at the bottom is a collar 14, on which an externally circumferential gripper groove 15 for automatic tool changing mechanisms is provided.

Indicated below collar 14 is a holding shaft 16 to which tools 17 can be selectably attached.

Tapered hollow shaft 12 has in its interior 18 a circumferential shoulder 19 that coacts with jaw segments of a clamping system, by means of which holder 10, known to this extent, can be inserted into a tool receptacle in a spindle of a machine tool.

Arranged in interior 18 of tapered hollow shaft 12, in a manner known per se, is a coolant tube 21 that is attached detachably to holder 10 by means of a coupling nut 22. Coolant tube 21 has a coolant conduit 24, opening into an inlet opening 23, through which the particular tool attached to holding shaft 16 is supplied with coolant, which is delivered from the machine tool in a manner yet to be described.

Coolant tube 21 has on its upper end an upper tube section 25, adjoining which, remote from the inlet opening 23, is a further tube section 26, the outer diameter of which is smaller than the outside diameter of the upper tube section 25, the cylindrical enveloping surface of which leads into further tube section 26, forming a conical transition region 28. The outside diameter at upper tube section 25 is, for example, 12 mm, while the outside diameter at further tube section 29 is 11 mm, i.e. is slightly less than 10% smaller than the outside diameter of upper tube section 25.

Remote from conical transition region 28, upper tube section 25 also has a conical tip 29 which tapers toward inlet opening 23.

It is evident that coolant tube 21 faces with its inlet opening 23 in the direction of upper opening 13 of tapered hollow shaft 12. Also noteworthy is the fact that holder 10 is used in conjunction with automatic tool changing mechanisms which sequentially transfer holders 10 between a magazine position and a working position on the spindle of a machine tool. In the magazine position, the holders are located in sheath-like covers so that no chips can get onto tapered hollow shaft 12 or into interior 18 of tapered hollow shaft 12. During the transfer of holder 10 from the magazine position into the working position, however, upper opening 13 is unprotected, so that chips dropping down from parts of the machine tool can also get into inlet opening 23. Cover 31 schematically indicated now prevents such chips from getting into coolant conduit 24 and ultimately clogging the narrow coolant conduits in the tool (not shown) to such an extent that cooling of the tool no longer occurs.

Figure 2:
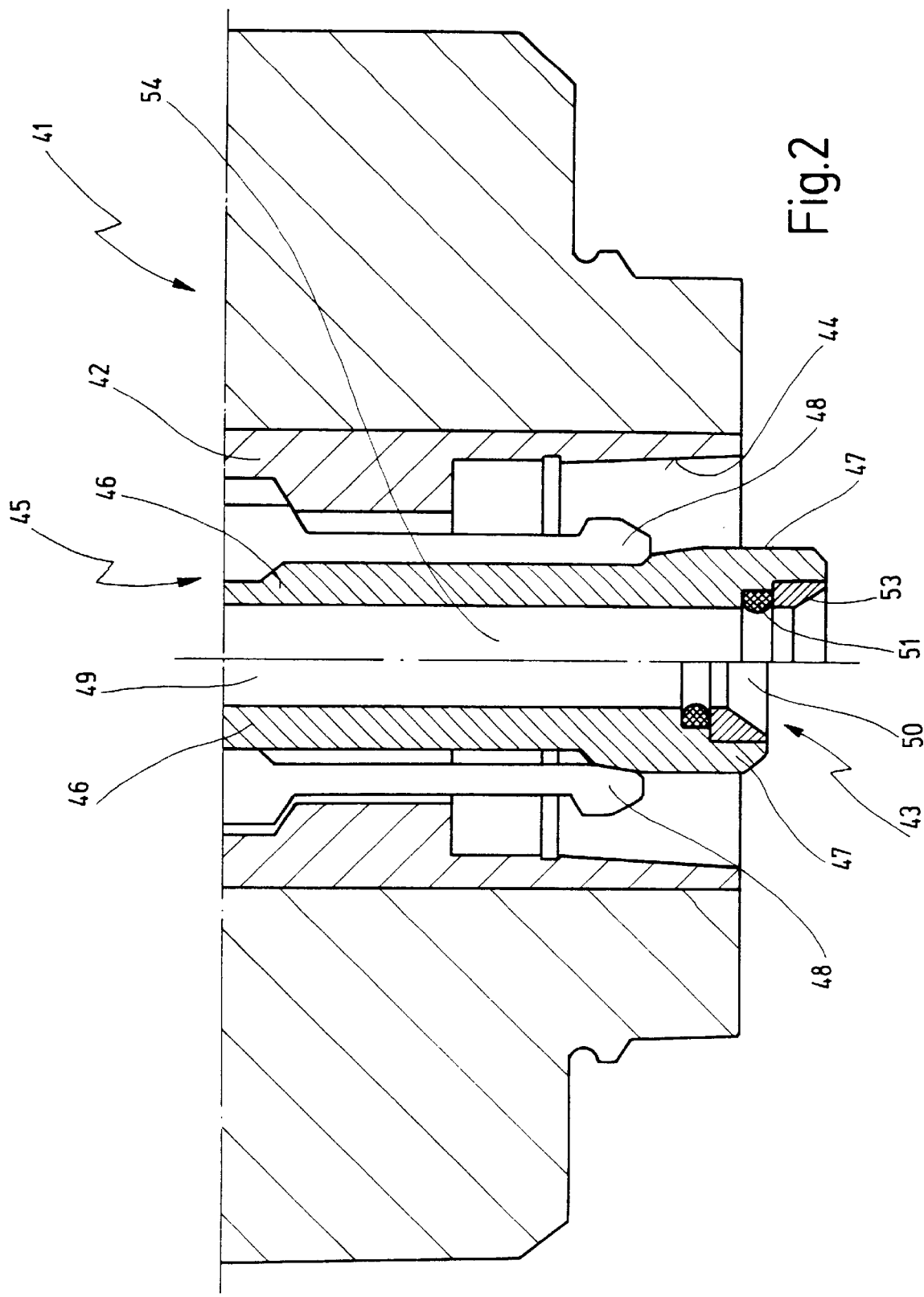
FIG. 2 shows, in a schematic representation, a partial longitudinal section through the region of the tool receptacle of a spindle of a machine tool.

FIG. 2 shows, in partial and very schematic fashion, a portion of a machine tool 41 in the region of its spindle 42. Spindle 42 has a tool receptacle 43 which comprises a conical opening 44, the shape of which is complementary in configuration to that of tapered hollow shaft 12. Depiction of the tapered hollow shaft has been omitted in FIG. 2 for reasons of clarity.

Arranged in spindle 42 is a clamping system 45 that comprises, in a manner known per se, a draw-in bar 46 with conical draw-in taper 47, as well as jaw segments 48. Clamping system 45 is shown in the right half of FIG. 2 in the released state, and in the left half in the clamped state, in which draw-in bar 46 and draw-in taper 47 are drawn in, so that jaw segment 48 is pressed outward, where it comes into contact with shoulder 19 in interior 18 of tapered hollow shaft 12 (see FIG. 1).

A centered bore 49, through which coolant is delivered to coolant tube 21 in holder 10, is provided in draw-in bar 46 and in draw-in taper 47. Centered bore 49 is enlarged in stepped fashion at its lower end 50, and carries there a sealing ring 51 which is screwed in by way of a brass insert 53. In that way, a supply tube 54 for coolants is formed, into which coolant tube 21 projects, if holder 10 is inserted in tool receptacle 43.

When inserting tapered hollow shaft 12 into tool receptacle 43, sealing ring 51, which is preferably an O-ring, first slides over the conical tip 29 onto the enveloping surface 27 of the upper tube section 25. When further inserting tapered hollow shaft 12 into tool receptacle 43, sealing ring 51 is then pulled off upper tube section 25 and is now first in the region of further tube section 26, where it is not in contact with enveloping surface 27.

While coupling/clamping of holder 10 into tool receptacle 43, clamping system 45 is in the position shown in the right half of FIG. 2.

Spindle 42 now performs a relative movement with respect to holder 10, which is held rotatably by the tool changing mechanism. Provided between spindle 42 and holder 10 are slide blocks and depressions—known per se, and not depicted in the drawings for reasons of clarity—which interlock with one another only in a specific radial alignment between spindle 42 and holder 10. As soon as this interlocking has taken place—i.e. holder 10 has been coupled into spindle 42—clamping system 45 is actuated. To this end, draw-in bar 46 is pulled back so that draw-in taper 47 presses jaw elements 48 outward, causing tapered hollow shaft 12 to be pulled slightly farther into conical opening 44 and finally clamped nonrotatably.

During this clamping operation, draw-in bar 46 executes a larger stroke which causes sealing ring 51 to be pulled back up over conical transition region 28 onto enveloping surface 27, where it provides tight sealing so that coolant delivered through centered bore 49 cannot run along on the outside of coolant tube 21.

Figure 3:
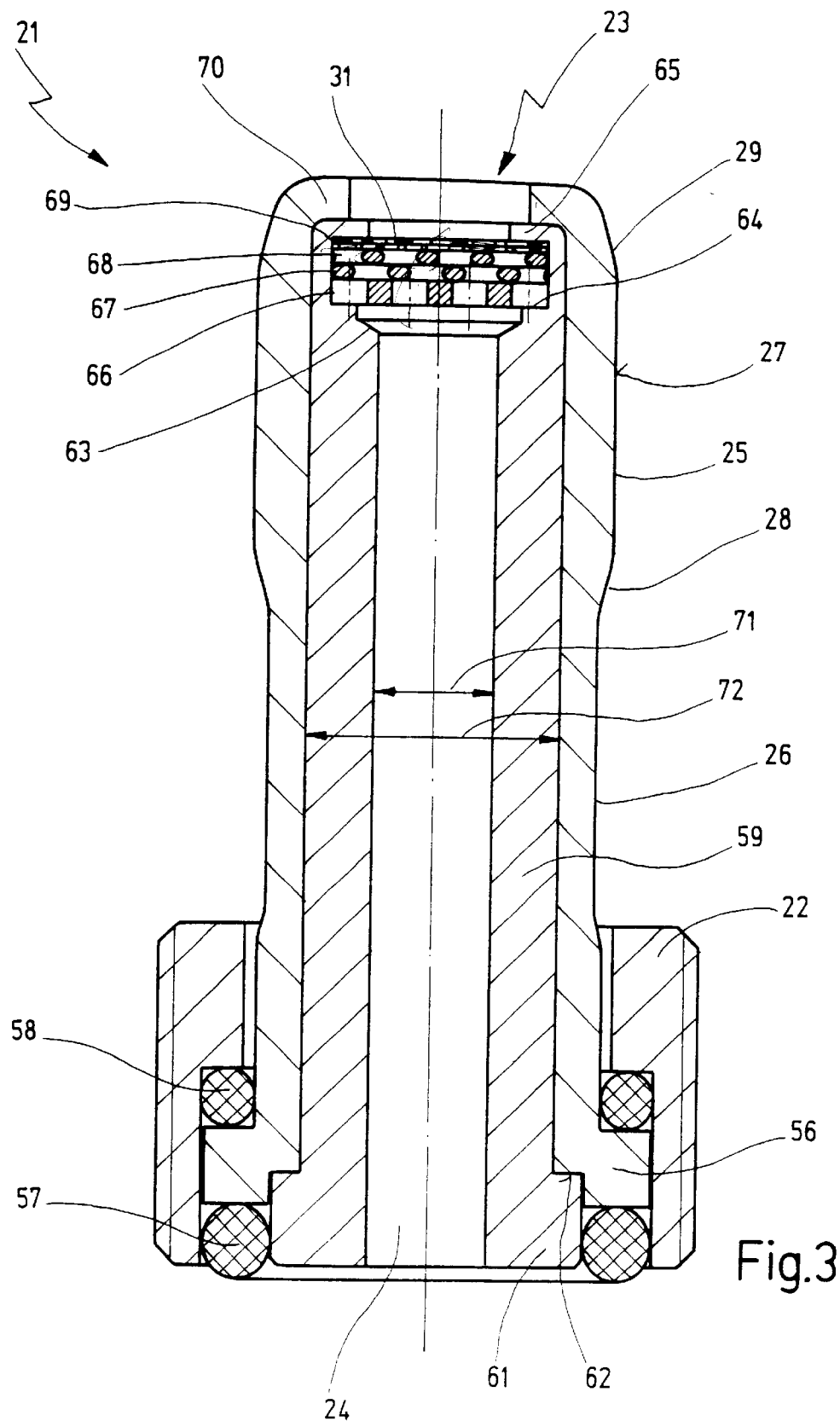
FIG. 3 shows a longitudinal section through the coolant tube of FIG. 1.

FIG. 3 shows coolant tube 21 from FIG. 2 in a schematic longitudinal section.

Coolant tube 21 has a flange 56 at its bottom end remote from inlet opening 23, by means of which it is, by using sealing rings 57 and 58, screwed to holder 10 by means of a coupling nut 22 having an outer thread.

In coolant tube 21, an insert tube 59 of brass, running lengthwise through or interspersing it, is arranged, which has, at its bottom end, a flange 61, which is in its mounted state in contact with a shoulder 62 in the interior of coolant tube 21. In that way, insert tube 59 is also screwed when coupling nut 22 is screwed with holder 10.

Coolant conduit 24 known from FIG. 1 extends in the center in the interior of insert tube 59 and, at its upper end, passes over into a shoulder 64 while forming a funnel 63. At its top 65, insert tube 59 is flanged in such a way that cover 31 is jammed between shoulder 64 and flanged top 65 and, thus, is fixed.

In the embodiment shown, cover 31 comprises first of all a sieve 66 in the shape of a coarse perforated plate, which rests directly on shoulder 64. Adjoining perforated plate 66 are two sieves 67, 68 with medium mesh size, at the outermost position there is a fine sieve 69 which is used to keep back chips.

In that manner, from the outer to the inner direction, a finer sieve is always supported by a coarser sieve, so that the finer sieve cannot be bent to the inner side. Should there be, unexpectedly, such a high coolant pressure that cover 31 is, in its whole, slightly pressed inwardly, it will be eventually supported and borne up by funnel 63.

In the region of conical tip 29, coolant tube 21 is additionally equipped with a rim 70 protruding to the inner side, which has contact to insert tube 59.

Coolant conduit 24 has a diameter indicated in 71, which is, due to the wall thickness of insert tube 59, distinctively smaller than an outward diameter of insert tube 59 indicated in 72, which corresponds to the diameter of the coolant conduit of the prior art.

In spite of distinctively reduced diameter 71 of coolant conduit 24, it is guaranteed that the required quantity of coolant through coolant tube 21 reaches holder 10 and from there tools 17.

By detaching coupling nut 22, coolant tube 21 can be removed from holder 10 without any problems. If coolant tube 21 is screwed off, insert tube 59 can be pulled off, so to speak, to the back, i.e. at the part remote from tip 29 out of coolant tube 21, and can be replaced by a new one, if cover 31 is clogged or cannot be used any more for some other reason.

Therefore, what I claim, is:

1. A coolant tube to be arranged in a tool holder, the coolant tube having an inlet opening for coolants, a cover at this inlet opening for preventing chips from entering into the coolant tube, and an exchangeable insert tube arranged within the coolant tube and having an integral flange with an inner surface abutting and holding the cover, wherein said coolant tube has on its top a rim that protrudes inwardly and wherein said insert tube flange has an outer surface that abuts said rim.

2. The coolant tube of claim 1, wherein said cover is fixed to the insert tube.

3. The coolant tube of claim 1, wherein said cover comprises at least one sieve.

4. The coolant tube of claim 3, wherein said insert tube has a centric coolant conduit with an inner diameter that, in the area of the inlet opening, widens step-like while forming a shoulder, whereby the at least one sieve rests on the shoulder.

5. The coolant tube of claim 4, wherein said at least one sieve includes another sieve with smaller mesh size and that rests on said sieve that is resting on the shoulder.

6. The coolant tube of claim 1, wherein said insert tube is manufactured from a softer metal than the coolant tube.

7. The coolant tube of claim 6, wherein said softer metal is brass.

8. The coolant tube of claim 1, wherein said coolant tube has a second flange on its lower end, that is screwed by means of a coupling nut with external thread to the holder.

9. A coolant tube to be arranged in a tool holder, the coolant tube having an inlet opening for coolants, a top rim protruding inwardly, a cover at the inlet opening for preventing chips from entering into the coolant tube, and an exchangeable insert tube arranged within the coolant tube for holding the cover, wherein said insert tube has a flanged top and the cover is jammed between the flanged top and a shoulder of the coolant conduit, and wherein said flanged top has an inner surface abutting the cover and an outer surface abutting said top rim.

10. A holder for a tool, having a tapered hollow shaft with an upper opening for clamping into a tool receptacle of a machine tool spindle, and a coolant tube arranged in said hollow tapered shaft for supply of coolants to the holder, wherein said coolant tube has an inlet opening for coolants, a cover at the inlet opening for preventing chips from entering into the coolant tube, and an exchangeable insert tube arranged within the coolant tube and having an integral flange with an inner surface abutting and holding the cover, wherein said coolant tube has on its top a rim that protrudes inwardly, and wherein said insert tube flange has an outer surface that abuts said rim.

11. A holder for a tool, having a tapered hollow shaft with an upper opening for clamping into a tool receptacle of a machine tool spindle, and a coolant tube arranged in said hollow tapered shaft for supply of coolants to the holder, wherein said coolant tube has an inlet opening for coolants, a top rim protruding inwardly, a cover at the inlet opening for preventing chips from entering into the coolant tube, and an exchangeable insert tube arranged within the coolant tube for holding the cover, wherein said insert tube has a flanged top with an inner surface and an outer surface, said inner surface abutting the cover and said outer surface abutting said top rim.

* * * * *

UNITED STATES PATENT AND TRADEMARK OFFICE
CERTIFICATE OF CORRECTION

PATENT NO. : 6,648,565 B2
DATED : November 18, 2003
INVENTOR(S) : Anton Schweizer It is certified that error appears in the above-identified patent and that said Letters Patent is hereby corrected as shown below:

Column 3,
Line 8, "201/min" should read -- 20 1/min --; and

Column 7,
Line 26, "this inlet opening" should read -- the inlet opening --.

Signed and Sealed this

Fifteenth Day of March, 2005

JON W. DUDAS
*Director of the United States Patent and Trademark Office*